UNITED STATES PATENT OFFICE.

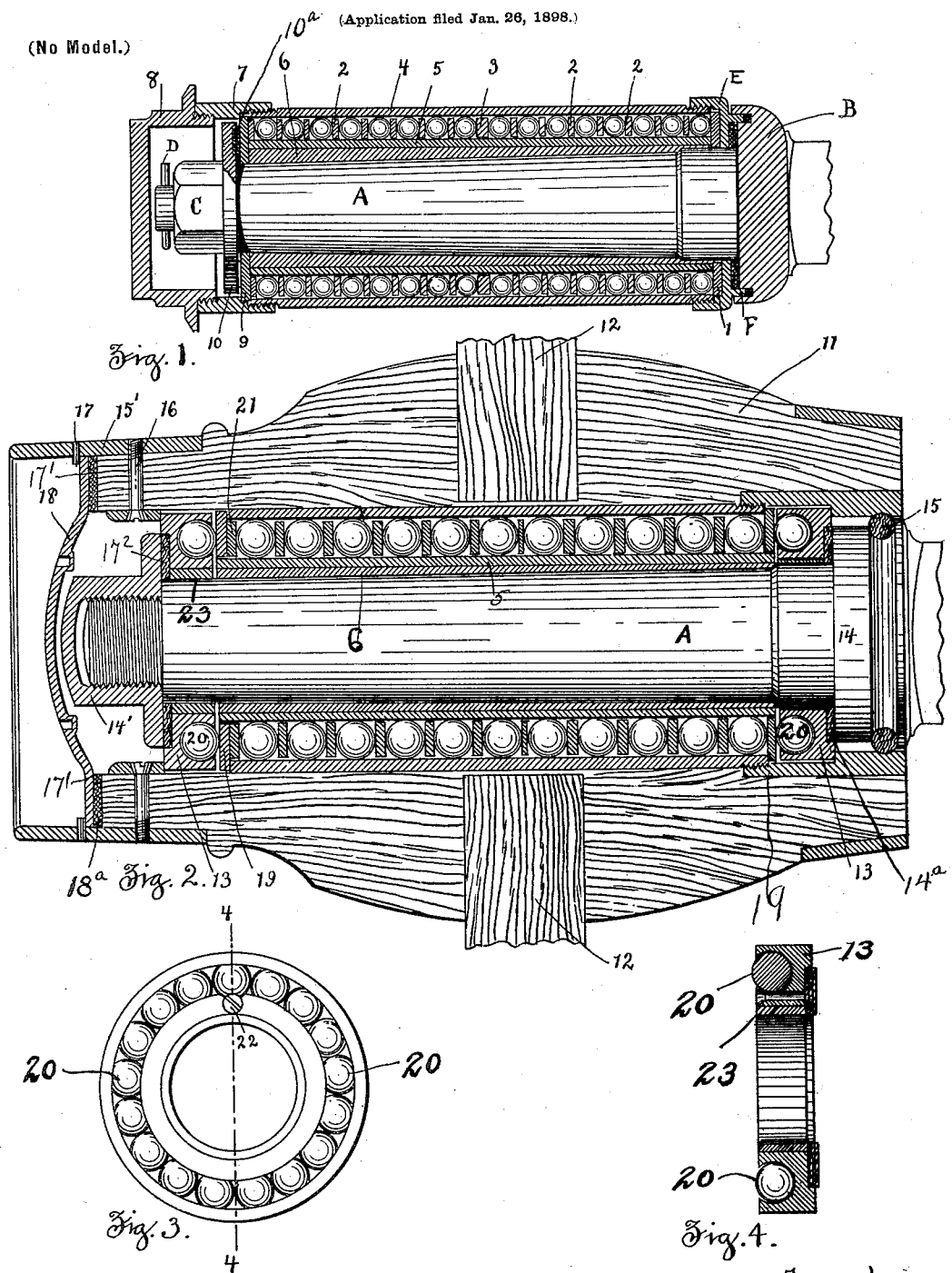

MERRILL E. CLARK, OF WORCESTER, MASSACHUSETTS.

BALL-BEARING.

SPECIFICATION forming part of Letters Patent No. 699,614, dated May 6, 1902.

Application filed January 26, 1898. Serial No. 667,994. (No model.)

*To all whom it may concern:*

Be it known that I, MERRILL E. CLARK, a citizen of the United States, residing at Worcester, in the county of Worcester and Commonwealth of Massachusetts, have invented certain new and useful Improvements in Ball-Bearings, of which the following is a specification.

The object of my invention is to provide a ball-bearing which will work successfully under ordinary conditions, but so constructed that if for any reason the balls or any of them should break or become displaced the box may acquire the usual sliding contact with the journal without interrupting the unimpeded revolution of the wheel. The construction of the bearing is also such that it can readily be adjusted to journals of varying size with ordinary tools and by an unskilled person.

In the drawings, Figure 1 shows in section the construction of my bearing as applied to the journal of an ordinary vehicle. Fig. 2 shows in section the construction of the bearing applied to a vehicle-axle and also an improved ball-bearing washer adapted to receive the end thrust of the box. Fig. 3 is a front view of the washer, showing the means by which the balls are held in place; and Fig. 4 is a vertical section through the line 4 4, Fig. 3.

In Fig. 1, A is the journal, provided with the steel shoulder B and the nut C, which holds the box in place, and which is further held by the cotter-pin D. E is a soft-metal collar secured to the other members of the box by a thread, as indicated. A horizontally-projecting shoulder F is adapted to secure a bearing within an annular slot in the steel shoulder, and the introduction of suitable packing, as indicated, prevents the access of any dust to the bearing. 1 is a hardened-steel ring between the soft collar and the first row of balls, and 2 2 are a series of hardened-steel rings, there being one ring between each two rows of balls. It will be noted that one of the rings 3 is thicker than the others for a purpose hereinafter to be explained. 4 is the outer of the two sleeves forming the chamber within which the balls run, and 5 is the inner sleeve. 6 is a bushing, of composition or gun-metal, encircling the journal and forming a bearing for it within the hardened-steel sleeve 5. The sleeve 5 encircles and is driven upon the bushing 6, forming a practically integral cylinder when in place and fitting so tightly thereon that the rotary motion of the journal independently of the sleeve 5 is practically impossible. 7 is a brass collar secured by a thread to the outer sleeve 4 and affords means for securing the dust-cap 8. 9 is a steel ring between which and the nut C is the flange 10, which holds all the parts in place. Between the ring 9 and the flange 10 of the nut C suitable packing $10^a$ is placed to provide an elastic surface to receive the end thrust. By varying the thickness of the rings, as shown at 3, the paths of the balls may be varied, if for any reason it becomes necessary.

Fig. 2 illustrates a modified form of the bearing, like that shown in Fig. 1 in its essential features, but differing in some details, but particularly in the introduction of the ball-bearing washers 13, adapted to receive the end thrust of the box, which must occur from time to time in the use of a vehicle. I will only enumerate the parts peculiar to the modified form of bearing. 11 illustrates the ordinary wooden hub, and 12 the spokes of the wheel. 13 is the ball-bearing washer, between which and the shoulder 14 of the journal is interposed an elastic washer $14^a$. 15 is a packing to prevent foreign substances from reaching the bearing. The washer 13 at the outer end of the journal is held in place by the nut 14'. The annular hub-plate 15', secured to the hub by the screws 16, is provided with pins 17, which hold in place the dust-plate 18, between which and the end of the hub is inserted proper packing $18^a$. Each ring 19 affords a bearing for the balls 20 of the washers 13, and the ring 21 between the ring 19 and the outer row of balls may be removed and placed at the inner extremity of the journal, thus varying the path of the balls, and the same result can be attained by varying the thickness of any of the rings, as explained in connection with Fig. 1.

Fig. 3 is a face view of the ball-bearing washer, which is made, preferably, from a single piece of steel, with an annular groove forming a raceway for the balls, the inner and outer walls of the raceway being so formed that the balls are held in place and prevented from dropping out. An aperture filled by the screw 22 affords means for introducing the balls into the pathway, and the screw 22 prevents the balls from escaping at that point. The washer 13 is provided with a bushing 23, of composition or gun-metal, forming a bearing upon the journal.

The operation of the bearing is normally that of any ball-bearing. If, however, one of the balls should break or be crushed or for any reason should cease to roll freely, sliding friction will at once be established both between the journal and the bushing in the box and the journal and the bushing 23 in the washer 13. The wheels of the vehicle will revolve freely, and the trouble can be remedied at the end of the journey. In the ball-bearing as ordinarily constructed the disarrangement of the balls might lead to the rupture of a box or the breaking of an axle.

The advantage of my improved form of construction is that under normal conditions the advantages of a ball-bearing may be had, and in case of accident to the balls the ordinary sliding bearing will be at once established. The bushing of soft metal can easily be reamed out to fit any journal and by an unskilled person with tools everywhere accessible.

What I claim as new, and desire to secure by Letters Patent, is—

1. In a ball-bearing device, the combination with a journal, of outer and inner sleeves surrounding the journal, a series of balls interposed between the sleeves, a bushing on the journal adapted to slide thereon when the rolling friction is interrupted, rings at either end of the journal whereby to retain the ball-bearings and act as stops therefor, and a flanged nut at the free end of the journal to maintain the parts in proper relation to one another.

2. In a ball-bearing device, the combination of a journal, a chamber in which balls may run around the journal, said chamber consisting of an inner sleeve and an outer sleeve, and a series of balls interposed between said inner and outer sleeves, and an intermediate bushing adapted to slide around said journal when rolling friction is interrupted, substantially as and for the purpose set forth.

3. In a ball-bearing device, the combination with a journal, of an outer and an inner sleeve surrounding said journal and forming a chamber, balls arranged within said chamber, rings arranged within said chamber and dividing the balls into annular rows, an intermediate bushing arranged to slide when rolling friction is interrupted, and a washer provided with balls to receive the end thrust of the box, substantially as and for the purpose set forth.

4. In a ball-bearing, the combination with a journal, a hard bushing surrounding the journal, and a plurality of sleeves surrounding the bushing, of rows of balls interposed between the sleeves, rings of varying width between each two rows of balls, hardened rings at either end of the sleeves, packing for receiving the end thrust of the journal, ball-bearing washers at either end of the journal, packing for excluding foreign material, and a nut removably secured on the outer end of the journal, the nut provided with a flange designed to retain the parts in place.

5. In a ball-bearing, the combination with a journal, a hard bushing surrounding the journal, and a plurality of sleeves surrounding the bushing, of rows of balls interposed between the sleeves, rings of varying width between each two rows of balls, hardened rings at either end of the sleeves, packing for receiving the end thrust of the journal, ball-bearing washers at either end of the journal, collars removably secured at either end of the outer sleeve, a dust-cap removably secured by the collar on one end of the outer sleeve, for excluding foreign material, and a nut removably secured on the outer end of the journal, the nut provided with a flange designed to retain the parts in place.

6. In a ball-bearing, the combination with a journal, a hard bushing surrounding the journal, and a plurality of sleeves surrounding the bushing, of rows of balls interposed between the sleeves, rings of varying width between each two rows of balls, hardened rings at either end of the sleeves, packing for receiving the end thrust of the journal, ball-bearing washers at either end of the journal, packing for excluding foreign material and a nut removably secured on the outer end of the journal, the nut provided with a flange designed to retain the parts in place, the outer end of the journal provided with an aperture to receive a cotter-pin whereby to prevent the accidental displacement of the nut.

7. In a ball-bearing, the combination with a journal, of a bushing, a plurality of sleeves spaced apart from each other, the innermost sleeve secured on the bushing against revolution thereon, rows of balls interposed between the sleeves, means for separating the rows of balls, ball-bearing washers and a flanged nut fitting upon the journal for retaining the parts in place.

8. In a ball-bearing, the combination with a journal, of a bushing surrounding the journal, the bushing capable of being made to fit any size of journal, sleeves surrounding the bushing, the inner sleeve secured on the bushing against rotation thereon, rows of balls interposed between the sleeves, means interposed between the rows of balls to retain them in predetermined lines of travel, and means secured on the journal for retaining the parts in place.

9. In a ball-bearing, the combination with a journal, of a bushing surrounding the journal, the bushing capable of being made to fit any size of journal, sleeves surrounding the bushing, the inner sleeve secured on the bushing against rotation thereon, rows of balls interposed between the sleeves, means interposed between the rows of balls to retain them in predetermined lines of travel, rings located at either end of the sleeves, collars to which the outer sleeve is secured, means secured on the journal for retaining the parts in place, and a dust-cap removably secured to the outer collar.

In testimony whereof I have hereunto set my hand in presence of two subscribing witnesses.

MERRILL E. CLARK.

Witnesses:
C. G. WASHBURN,
R. M. WASHBURN.